Aug. 19, 1941.　　D. L. COOPER ET AL　　2,252,799
COMBINED BEET HARVESTING MACHINE
Filed Jan. 10, 1939　　　4 Sheets-Sheet 1
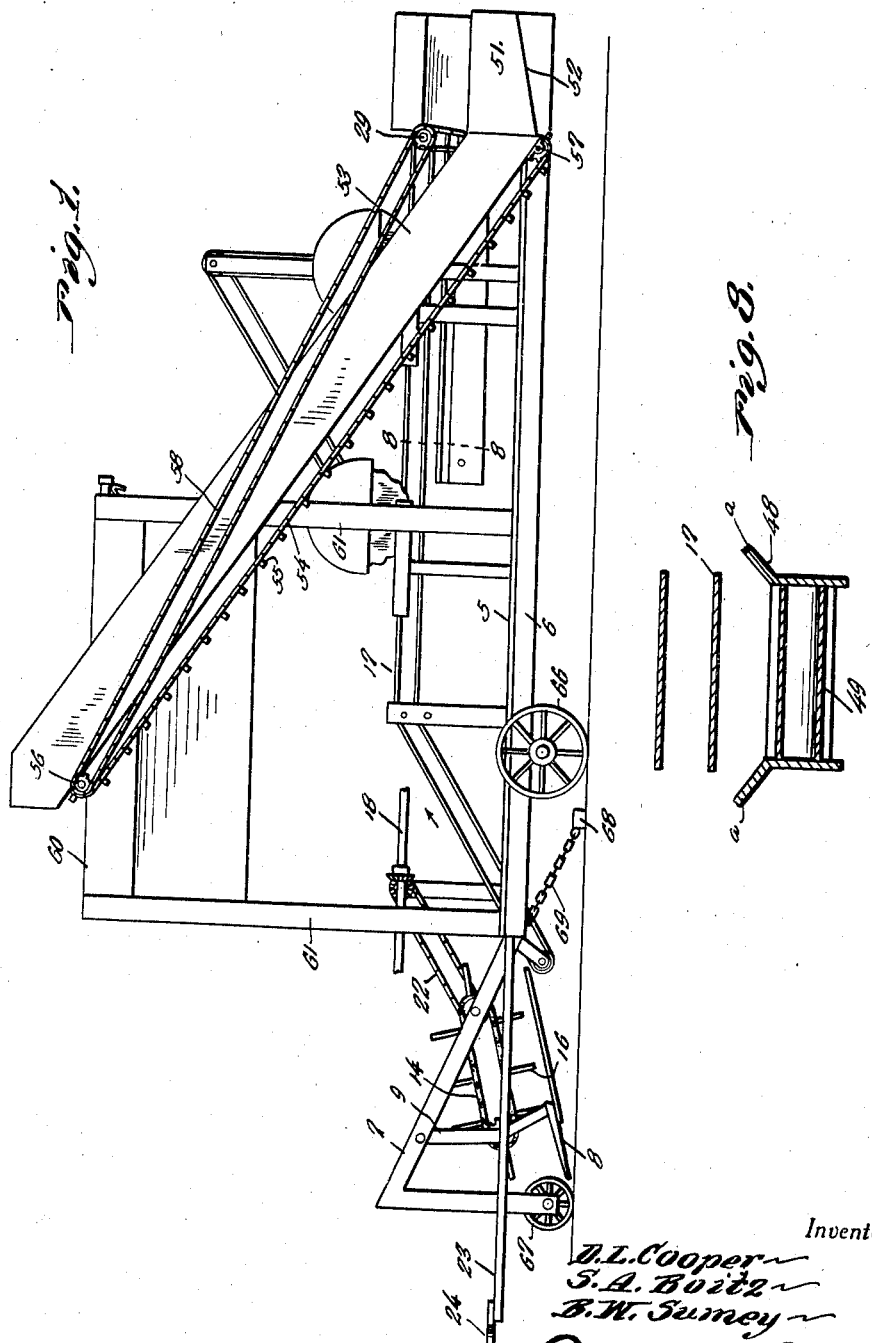
Inventors
D. L. Cooper
S. A. Boitz
B. W. Sumey
By Clarence A. O'Brien
and Hyman Berman
Attorneys

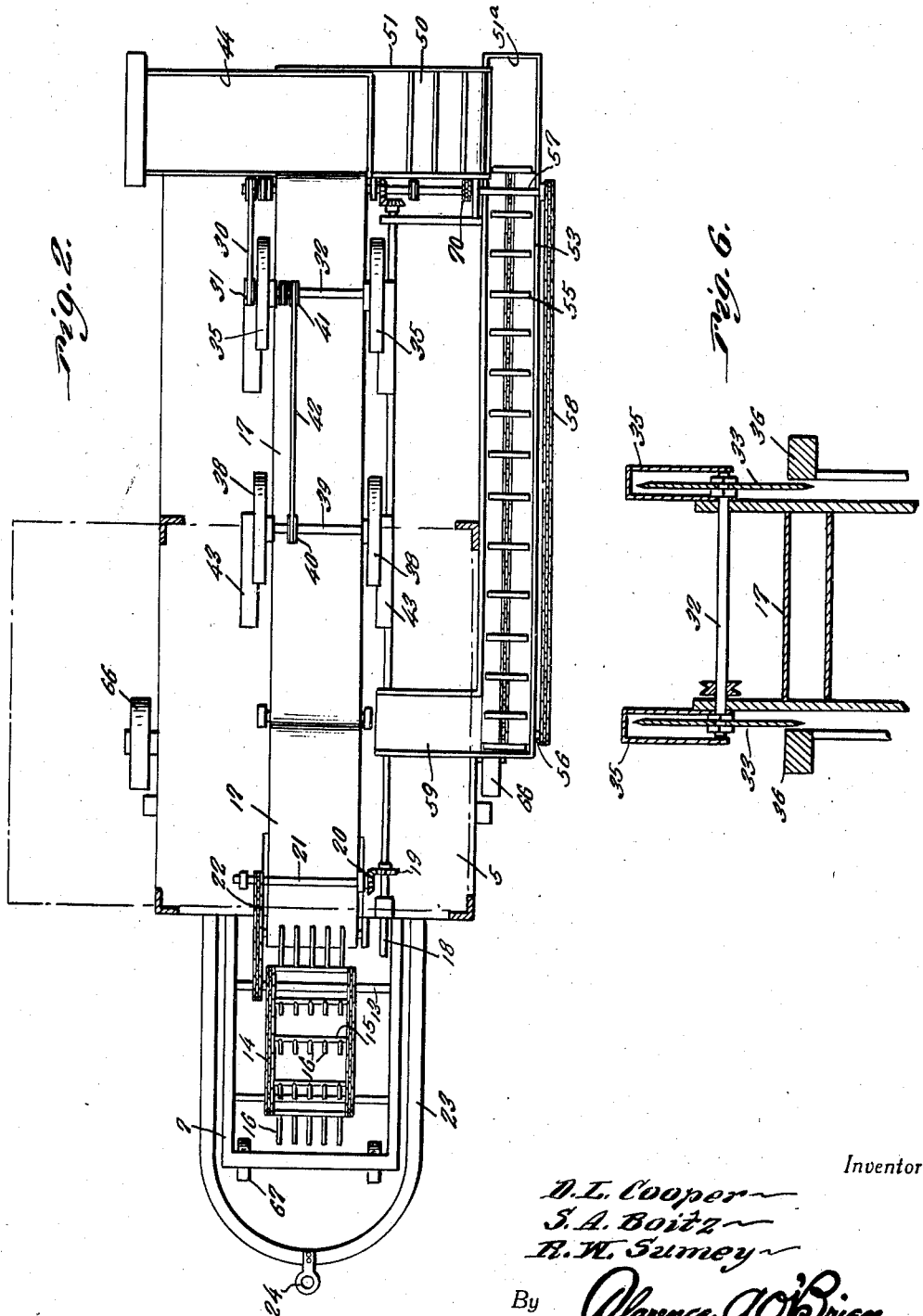

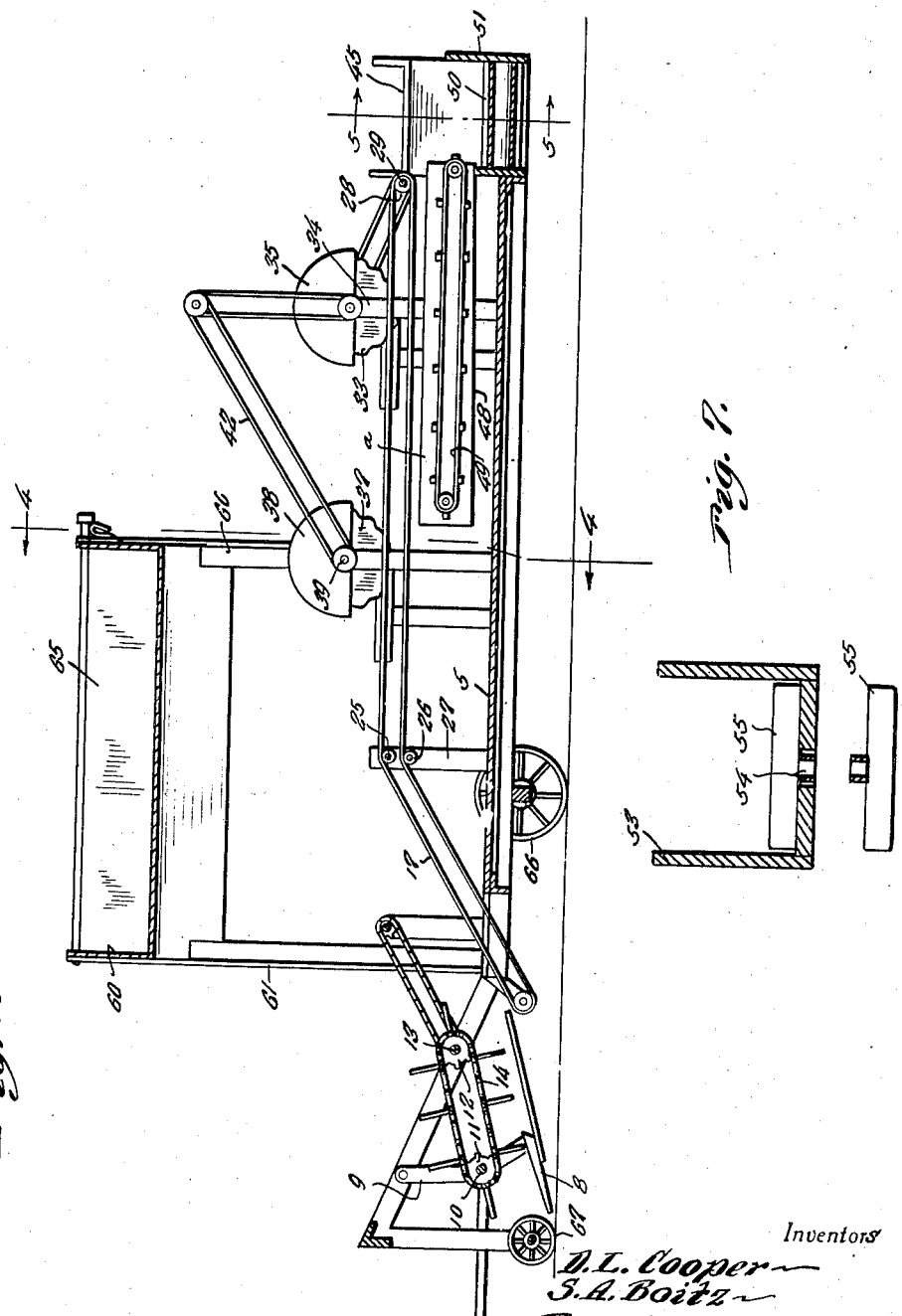

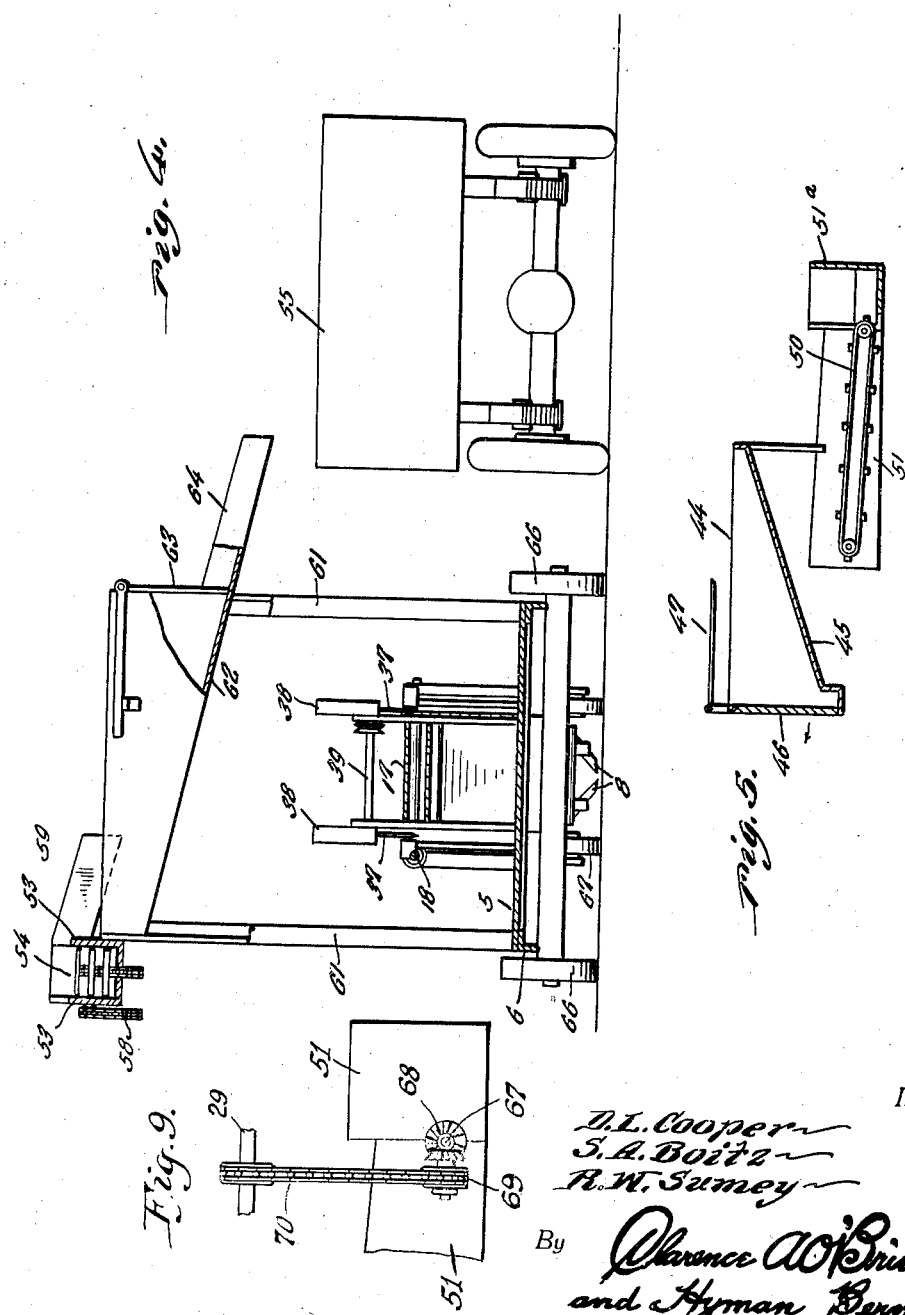

Patented Aug. 19, 1941

2,252,799

UNITED STATES PATENT OFFICE 2,252,799

COMBINED BEET HARVESTING MACHINE

Dallas L. Cooper, Stanley A. Boitz, and Robert W. Sumey, Pueblo, Colo.

Application January 10, 1939, Serial No. 250,218

4 Claims. (Cl. 146—85)

This invention appertains to new and useful improvements in harvesting machines and more particularly to a beet harvesting machine of the combined type.

The principal object of the present invention is to provide a combined beet harvesting machine which is constructed and operated to pull the beets, top the same and load the beets into piles.

Another important object of the invention is to provide a combined beet harvesting machine which not only pulls the beets and harvests the same, but also levels the soil after the pulling operation and places the beet tops in piles or bunches.

Another object of the invention is to provide a machine of the character stated which is of simple construction yet durable in operation and not susceptible to the ready development of defects.

These and various other important objects and advantages of the invention will become apparent to the reader of the following specification:

In the drawings—

Figure 1 represents a side elevational view of the apparatus.

Figure 2 is a top plan view.

Figure 3 is a longitudinal sectional view.

Figure 4 is a cross sectional view on a line 4—4 of Figure 3 and showing a loading truck adjacent to the machine.

Figure 5 is a sectional view on the line 5—5 of Figure 3.

Figure 6 is a sectional view through one of the cutting assemblies.

Figure 7 is a cross sectional view through the topped beet conveyor.

Figure 8 is a cross sectional view taken substantially on a line 8—8 of Figure 1.

Figure 9 is a fragmentary detailed sectional view of the drive for the lateral conveyor.

Referring to the drawings, wherein like numerals designate like parts, it can be seen in the drawings that numeral 5 represents the platform supported by the frame 6.

A narrow frame 7 inclines forwardly from the frame 6 for supporting the beet puller blades 8. Arms 9 extend downwardly to support the puller blades 8 and these arms also support the forward shaft 10 on which are the sprockets 11 and trained over these sprockets 11 and the sprockets 12 on the shaft 13 are the chains 14 bridged by bars 15 carrying the spikes 16 which serve to feed the pulled beets backwardly onto the inclined forward end portion of the conveyor belt 17.

Numeral 18 denotes the main drive shaft which at its forward end portion has the bevel gear 19 meshing with the bevel gear 20 on the shaft 21 overlying the inclined portion 17 of the belt and a chain drive 22 is taken from this shaft 21 to the shaft 13 for driving the said beet picking mechanism afore described.

Numeral 23 denotes a yoke which straddles the frame 7 and has the draft eye 24 at its forwardmost portion.

The endless belt 17 extends longitudinally of the machine and is first disposed over the rollers 25—26 supported by the posts 27. The belt then extends rearwardly and passes over the rear roller 28 which is on the shaft 29 driven by the belt 30 which is trained over the pulley 31 on the shaft 32 with the two knives 33. The shaft 32 is trained through the post 34 and each disk blade has the disk bars 35 disposed thereover.

A guard rail 36 extends along the outside of each blade so as to protect the workman standing on the platform 5 adjacent the belt 17.

A second pair of cutting disks 37 are provided forward of the blades 33 and each of these has the guard 38. These blades 37 are carried by the shaft 39 on which is a pulley 40 and trained over this pulley 40 and the pulley 41 on the shaft 32 is the belt 42 whereby the shaft 39 and its blades 37 are driven by the shaft 32. The blades 37 are likewise provided with guard rails 43.

The rear terminus of the belt 17 is overlying the hopper 44 which has a slanting bottom 45 and a gate 46 which is opened by the control rod 47 which extends to some manual control, preferably foot pedals.

Underlying the belt 17 is the cross-shaped structure 48 in which the endless conveyor 49 operates. The upper portions of the side walls of this trough slant outwardly as at $a$—$a$ for the purpose of catching topped beets which are dropped onto the conveyor by the workmen.

A laterally extending conveyor 50 operating between the side walls 51 has its lower end terminating in the box 51$a$, and rising from this box 51$a$ which has a slanting bottom 52 is an elevator made up of the inclined side walls 53 and the endless belt 54 operating therein.

This endless belt 54 which is provided with transversely extending cleats 55 is disposed over the upper and lower rolls on the shaft 56 and 57 and the chain 58 taken off of the shaft 29 serves to drive this elevator which has a laterally inclined chute 59 extending from its upper end to terminate over the beet bin 60 which is supported by the upright 61 on the platform 5 and overlying the forward portion of the conveyor 17.

This bin is provided with the sloping bottom 62 and has the gate 63 at its lower end which will open when manually controlled or when a definite weight of beets loaded in the bin forces against the same. Extending outwardly beyond the gate 63 is the chute 64 for delivering the discharged beets into a truck 65 or to form piles on the ground.

The frame 6 is supported by the wheels 66 while the forward portion of the frame 7 is supported by the wheels 67 and a drag bar 68 tends to level the soil after the beets have been pulled, and this bar is dragged by the chains 69 extending from the frame 6.

As can be seen in Figure 9, the lateral conveyor 50 has one shaft 67 driven by the bevel gears 68 and 69 and the chain 70 taken off of the aforementioned conveyor shaft 29.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. In a beet harvester, a beet carrying conveyor, a cutting knife mounted for operation adjacent one edge of the conveyor, a second conveyor underlying the first-mentioned conveyor, said second-mentioned conveyor being provided with a trough-like structure, the side walls of which flare outwardly beyond the edges of the first-mentioned conveyor to deflect beets dropped from the first-mentioned conveyor on to the second mentioned conveyor.

2. In a beet harvester, a beet carrying conveyor, a cutting knife mounted for operation adjacent one edge of the conveyor, a second conveyor underlying the first-mentioned conveyor, said second-mentioned conveyor being provided with a trough-like structure, the side walls of which flare outwardly beyond the edges of the first-mentioned conveyor to deflect beets dropped from the first-mentioned conveyor on to the second-mentioned conveyor, a post on which the knife is mounted for operation, and a hood mounted on said post and adapted to encase a portion of the knife.

3. In a beet harvester, a beet carrying conveyor, a cutting knife mounted for operation adjacent one edge of the conveyor, a second conveyor underlying the first-mentioned conveyor, said second-mentioned conveyor being provided with a trough-like structure, the side walls of which flare outwardly beyond the edges of the first-mentioned conveyor to deflect beets dropped from the first-mentioned conveyor on to the second-mentioned conveyor, a post on which the knife is mounted for operation, and a hood mounted on said post and adapted to encase a portion of the knife, and a guard rail extending longitudinally of the first-mentioned conveyor and between which and the conveyor the knife operates.

4. In a beet harvester, a beet carrying conveyor, a cutting knife mounted for operation adjacent one edge of the conveyor, a second conveyor underlying the first-mentioned conveyor, said second-mentioned conveyor being provided with a trough-like structure, the side walls of which flare outwardly beyond the edges of the first-mentioned conveyor to deflect beets dropped from the first-mentioned conveyor on to the second mentioned conveyor, a receptor for catching beet tops discharged from the first-mentioned conveyor, and a second receptor to which beets are delivered from the second-mentioned conveyor.

DALLAS L. COOPER.
STANLEY A. BOITZ.
ROBERT W. SUMEY.